US009436260B2

(12) United States Patent
Asano (10) Patent No.: US 9,436,260 B2
(45) Date of Patent: Sep. 6, 2016

(54) METHOD AND SYSTEM FOR ENSURING A RESIDUAL BATTERY CAPACITY REACHING A PREDETERMINED VALUE BEFORE TRANSITIONING APPARATUS TO POWER-SAVING MODE

(71) Applicant: CANON KABUSHIKI KAISHA, Tokyo (JP)

(72) Inventor: Kohei Asano, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 371 days.

(21) Appl. No.: 14/080,875

(22) Filed: Nov. 15, 2013

(65) Prior Publication Data

US 2014/0143566 A1 May 22, 2014

(30) Foreign Application Priority Data

Nov. 15, 2012 (JP) ................................ 2012-251263

(51) Int. Cl.
G06F 1/26 (2006.01)
G06F 1/32 (2006.01)
H02J 7/00 (2006.01)
H02J 9/00 (2006.01)

(52) U.S. Cl.
CPC ........... *G06F 1/3212* (2013.01); *G06F 1/3203* (2013.01); *G06F 1/3243* (2013.01); *H02J 7/0026* (2013.01); *H02J 7/0054* (2013.01); *H02J 7/0086* (2013.01); *H02J 9/005* (2013.01); *H02J 2007/004* (2013.01); *H02J 2007/005* (2013.01); *Y02B 60/1292* (2013.01)

(58) Field of Classification Search
CPC .. H02J 7/0054; H02J 9/005; H02J 2007/005; H02J 7/0026; H02J 2007/004; H02J 7/0086; G06F 1/3203; G06F 1/3243
See application file for complete search history.

(56) References Cited

U.S. PATENT DOCUMENTS

| 7,595,609 | B2 | 9/2009 | Wang et al. |
| 8,558,515 | B2 | 10/2013 | Baba et al. |
| 8,806,241 | B2 | 8/2014 | Shimizu et al. |
| 2009/0140696 | A1 | 6/2009 | Okuto |
| 2013/0026996 | A1* | 1/2013 | Kasahara ............... B60L 3/0046 320/134 |
| 2013/0047015 | A1* | 2/2013 | Nagumo ............ G03G 15/5004 713/320 |

FOREIGN PATENT DOCUMENTS

| CN | 101477176 | | 7/2009 |
| CN | 101515976 | A | 8/2009 |
| CN | 102163839 | A | 8/2011 |
| CN | 102437618 | A | 5/2012 |
| JP | 2007-005944 | A | 1/2007 |

OTHER PUBLICATIONS

Chinese Office Action issued in counterpart Chinese application No. CN201310573181.2, dated Nov. 5, 2015. English translation provided.

* cited by examiner

*Primary Examiner* — Xuxing Chen
(74) *Attorney, Agent, or Firm* — Rossi, Kimms & McDowell LLP (57) ABSTRACT

An electronic apparatus that is capable of preventing overcharge and overdischarge of a battery. The electronic apparatus is operatable in a normal mode and a first power saving mode with less power consumption. A battery supplies electric power until battery residual capacity reaches a first threshold in the first power saving mode. A charging unit charges the battery in the normal mode. A control unit controls, in a case that the battery residual capacity is smaller than a second threshold larger than the first threshold when transition to the first power saving mode is made, so as to charge the battery until the battery residual capacity reaches the second threshold, and make a transition to the first power saving mode.

7 Claims, 8 Drawing Sheets

METHOD AND SYSTEM FOR ENSURING A RESIDUAL BATTERY CAPACITY REACHING A PREDETERMINED VALUE BEFORE TRANSITIONING APPARATUS TO POWER-SAVING MODE

BACKGROUND OF THE INVENTION

1. Field of the Invention

The present invention relates to an electronic apparatus that can operate in a power saving mode, a control method therefor, and a storage medium storing control program therefor.

2. Description of the Related Art

In a recent electronic apparatus like an image forming apparatus, the number of functions increases and the functions are made highly functional, which tends to increase the maximum electric power consumption. Since electric power that can be supplied through one power supply line is limited, the method of supplying insufficient electric power temporarily from a battery that is connected in parallel to the power supply is proposed (for example, see Japanese Laid-Open Patent Publication (Kokai) No. 2007-5944 (JP 2007-5944A)).

On the other hand, such an image forming apparatus is provided with power saving operational modes in addition to a normal mode. When the apparatus does not perform operations, such as printing, the apparatus make a transition to a power saving operational mode and operates with low power consumption. For example, the apparatus goes into one power saving operational mode in the intervals between printings. The apparatus frequently goes into this power saving operational mode and frequently returns to a normal operational mode. Moreover, the apparatus goes into another power saving operational mode on a weekend etc. In this power saving operational mode, the apparatus operates under ultra-low power consumption state for long time.

An electronic apparatus using a battery needs to avoid overdischarge and overcharge of the battery. However, when the apparatus is used in a power saving operational mode, the apparatus keeps an overcharge state in long time or is left in an overdischarge state unless charge and discharge are controlled appropriately.

SUMMARY OF THE INVENTION

The present invention provides an electronic apparatus operatable in a power saving mode, a control method therefor, and a storage medium storing control program therefor, which are capable of controlling to prevent overcharge and overdischarge of a battery.

Accordingly, a first aspect of the present invention provides an electronic apparatus that is operatable in a normal mode and a first power saving mode with less power consumption than the normal mode, comprising a battery configured to supply electric power until battery residual capacity reaches a first threshold in the first power saving mode, a charging unit configured to charge the battery in the normal mode, and a control unit configured to control, in a case that the battery residual capacity is smaller than a second threshold larger than the first threshold when transition to the first power saving mode is made, so as to charge the battery until the battery residual capacity reaches the second threshold, and make a transition to the first power saving mode.

Accordingly, a second aspect of the present invention provides an electronic apparatus that is operatable in a normal mode and a second power saving mode with less power consumption than the normal mode, comprising a battery configured to supply electric power in the second power saving mode, a charging unit configured to charge the battery until battery residual capacity reaches a third threshold in the normal mode, and a control unit configured to control, when transition to the second power saving mode is made, so as to charge the battery until the battery residual capacity reaches a fourth threshold larger than the third threshold, and make transition to the second power saving mode.

Accordingly, a third aspect of the present invention provides a control method for an electronic apparatus that is operatable in a normal mode and a first power saving mode with less power consumption than the normal mode, and that has a battery, the control method comprising supplying electric power from the battery until battery residual capacity reaches a first threshold in the first power saving mode, charging the battery in the normal mode, and controlling, in a case that the battery residual capacity is smaller than a second threshold larger than the first threshold when transition to the first power saving mode is made, so as to charge the battery until the battery residual capacity reaches the second threshold, and make a transition to the first power saving mode.

Accordingly, a fourth aspect of the present invention provides a control method for an electronic apparatus that is operatable in a normal mode and a second power saving mode with less power consumption than the normal mode, and that has a battery, the control method comprising supplying electric power from the battery in the second power saving mode, charging the battery until battery residual capacity reaches a third threshold in the normal mode, and controlling, when transition to the second power saving mode is made, so as to charge the battery until the battery residual capacity reaches a fourth threshold larger than the third threshold, and make transition to the second power saving mode.

Accordingly, a fifth aspect of the present invention provides a non-transitory computer-readable storage medium storing a control program causing a computer to execute the control method for the electronic apparatus according to the third aspect.

Accordingly, a sixth aspect of the present invention provides a non-transitory computer-readable storage medium storing a control program causing a computer to execute the control method for the electronic apparatus according to the fourth aspect.

According to the present invention, the electronic apparatus operatable in a power saving mode, the control method therefor, and the storage medium storing control program therefor, which are capable of controlling to prevent overcharge and overdischarge of a battery.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings. This embodiment describes an image forming apparatus as an electronic apparatus of the present invention.

Figure 1:
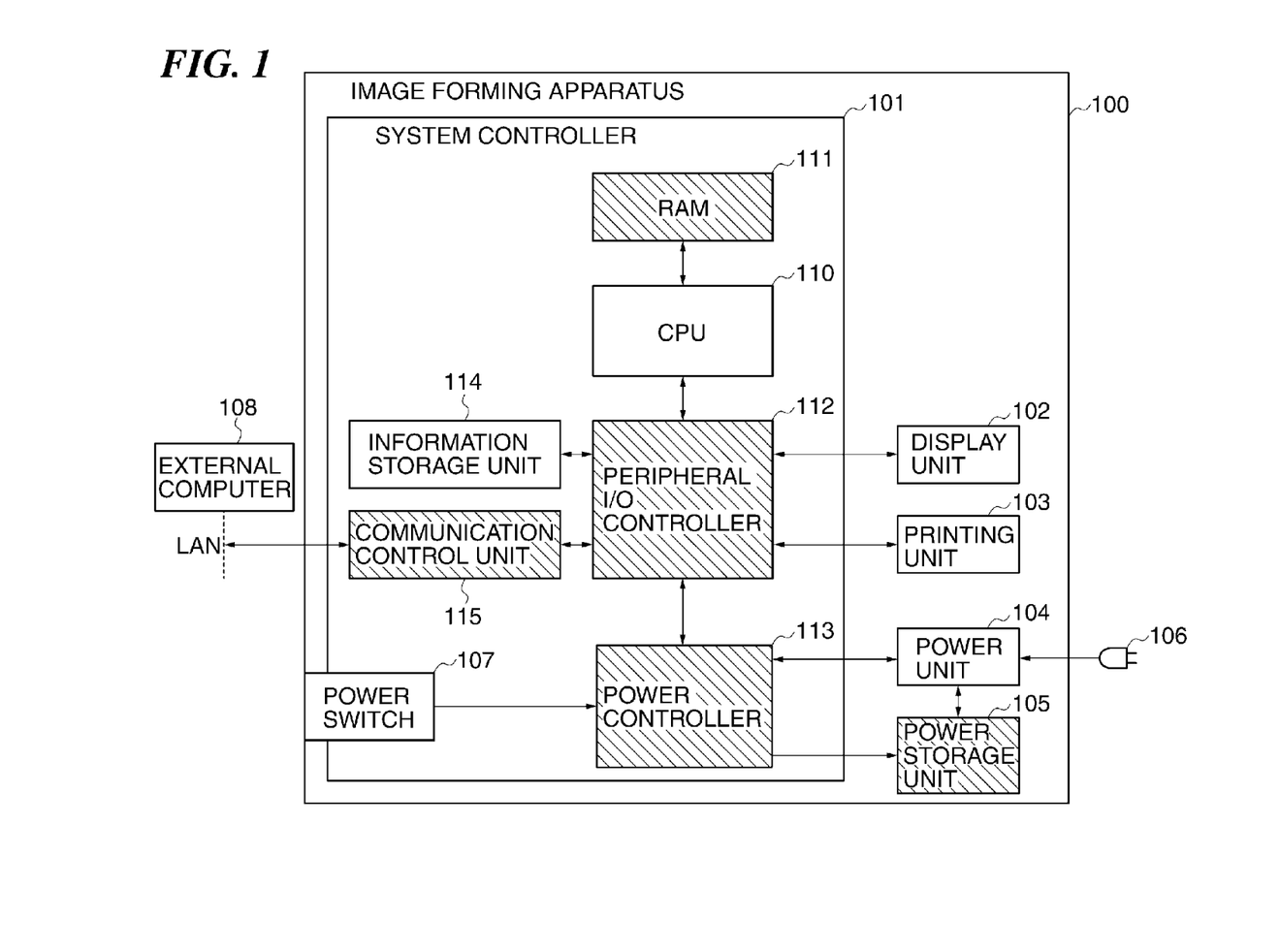
FIG. 1 is a block diagram schematically showing a configuration of an image forming apparatus according to an embodiment of the present invention.

FIG. 1 is a block diagram schematically showing a configuration of an image forming apparatus 100 according to an embodiment of the present invention.

As shown in FIG. 1, the image forming apparatus 100 consists of a system controller 101, a display unit 102, a printing unit 103, a power unit 104, and a power storage unit 105.

The system controller 101 consists of a CPU 110, a RAM 111, a peripheral IO controller 112, a power controller 113, an information storage unit 114, and a communication control unit 115.

The CPU 110 controls operations of the entire image forming apparatus 100 as the center of the system controller 101. The RAM 111 is a volatile memory connected to the CPU 110, stores software that is necessary to operate the CPU 110, and stores data for forming images.

The peripheral IO controller 112 is connected to the CPU 110, and controls connected peripheral devices according to instructions of the CPU 110. The power controller 113 is connected to the peripheral IO controller 112, and controls power supply of the entire image forming apparatus 100.

The information storage unit 114 is connected to the peripheral IO controller 112, and stores software etc. that are used by the CPU 110. The communication control unit 115 is connected to the peripheral IO controller 112, and is connected to an external computer 108 through a LAN.

The display unit 102 is connected to the peripheral IO controller 112, and displays the display data generated by the CPU 110 on an LCD panel (not shown). The printing unit 103 is connected to the peripheral IO controller 112, receives the printing data that is generated by the CPU 110, and prints it on a sheet.

The power unit 104 is connected to AC power through an inlet 106. The power unit 104 is connected to the power controller 113, and supplies the electric power to the entire image forming apparatus 100 according to instructions of the power controller 113, and also plays the role that changes the supplying system.

The power storage unit 105 is electrically connected to the power unit 104, charges the electric power received from the power unit 104, and discharges the charged power to supply the electric power to the power unit 104.

Furthermore, the power storage unit 105 is connected with the power controller 113 too, and notifies own status to the power controller 113. A power switch 107 is connected to the power controller 113 and functions as a main switch of the image forming apparatus 100.

The image forming apparatus 100 is provided with two power saving operational modes with less power consumption than a normal operational mode. The first power saving mode intercepts the power supply only to the display unit 102 and the printing unit 103, and is expressed as sleep.

The second power saving mode comes when the power switch 107 is turned OFF by a user, and is expressed as quick-off. In the quick-off, the power is supplied only to the devices (the communication control unit 115, the RAM 111, the peripheral IO controller 112, the power controller 113, and the power storage unit 105) hatched in FIG. 1.

The sleep is a power saving operational mode that is assumed to be transferred frequently from the normal operational mode. In the first power saving mode, although the power consumption is high, the quick transition to the first power saving operational mode and the quick return to the normal operational mode are possible.

On the other hand, the quick-off is a power saving operational mode that is assumed to keep the operation in the power saving operational mode in long time like a weekend. Although the quick transition to the second power saving operational mode and the quick return to the normal operational mode are impossible, the power consumption can be smaller than the sleep.

Figure 2:
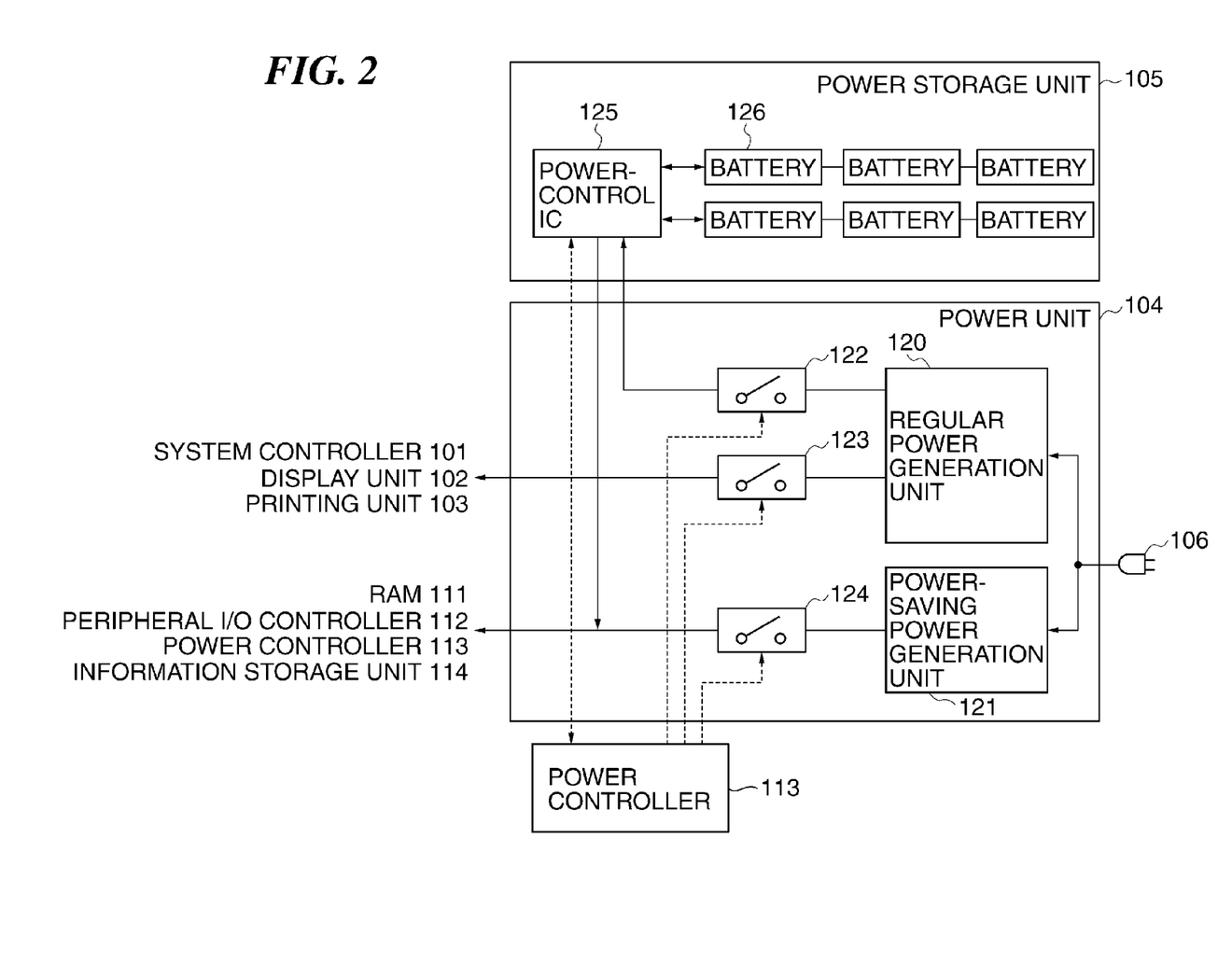
FIG. 2 is a block diagram schematically showing configurations of a power unit and a power storage unit shown in FIG. 1.

FIG. 2 is a block diagram schematically showing configurations of the power unit 104 and the power storage unit 105 shown in FIG. 1.

As shown in FIG. 2, the power unit 104 consists of a regular power generation unit 120, a power-saving power generation unit 121, a charging system relay 122, a regular power system relay 123, and a power-saving system relay 124.

The regular power generation unit 120 generates electric power that the image forming apparatus 100 uses during a normal operation. The regular power generation unit 120 supplies the power to the system controller 101, the printing unit 103, etc. through the regular power system relay 123.

The power-saving power generation unit 121 generates electric power that is used in the power saving operational modes. Moreover, the power-saving power generation unit 121 supplies the power to the units that continue operating even in the power saving operational modes, such as the peripheral IO controller 112 and the power controller 113, through the power-saving system relay 124.

The power storage unit 105 consists of a battery 126 that stores electric energy, and a battery-control IC 125 that monitors the electric energy stored in the battery 126 and that switches a charging/discharging system.

The battery 126 can supply the electric power during the operation in the sleep and the quick-off. The battery-control IC 125 is connected with the regular power generation unit 120 through the charging system relay 122, and charges the battery 126 with the electric power from the regular power generation unit 120. Moreover, the battery-control IC 125 is connected with a power-saving power system too, and discharges the electric power stored in the battery 126 to the power-saving power system.

These charging/discharging systems are controlled according to the instructions from the power controller 113 that is connected with the battery-control IC 125. The power controller 113 can monitor the electric energy currently stored in the power storage unit 105 through the battery-control IC 125, and also can switches the charging system relay 122, the regular power system relay 123, and the power-saving system relay 124. In the power saving operational modes, the electric power is supplied as much as possible from the power storage unit 105 in order to reduce the electric power inputted through the inlet 106. However, when the battery residual capacity of the battery 126 decreases, the battery 126 is charged during the operation in the sleep. On the other hand, when the battery residual capacity of the battery 126 decreases, the apparatus is shut down without charging during the operation in the quick-off.

Figure 3:
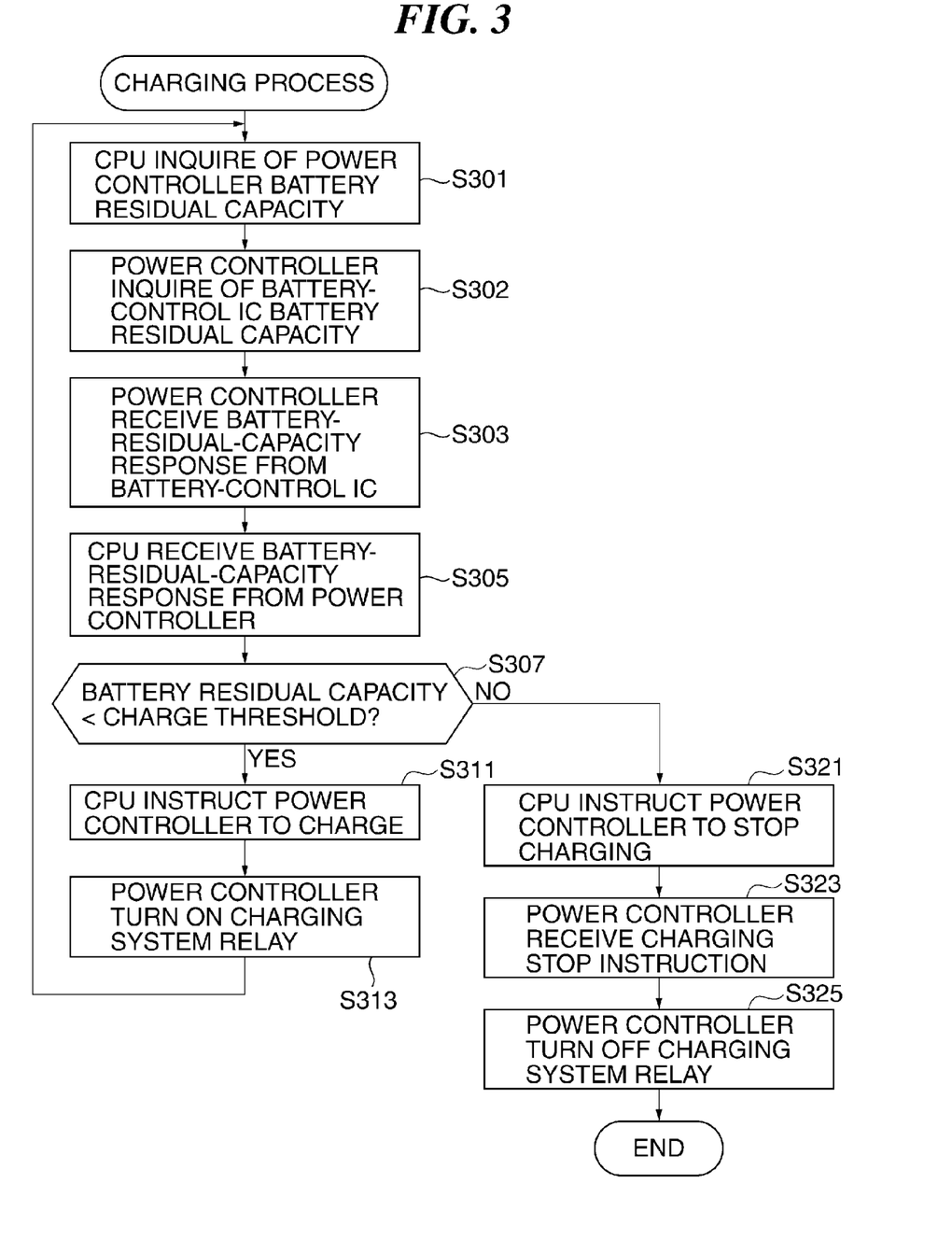
FIG. 3 is a flowchart showing a procedure of a charging process executed by a system controller shown in FIG. 1.

FIG. 3 is a flowchart showing a procedure of a charging process executed by the system controller 101 shown in FIG. 1. It should be noted that the charging process shown in FIG. 3 is called and executed in charging/discharging control processes shown in FIG. 4 and FIG. 7 that will be described later.

As shown in FIG. 3, the CPU 110 inquires of the power controller 113 the battery residual capacity of the power storage unit 105 first (step S301). Then, the power controller 113 inquires of the battery-control IC 125 the battery residual capacity (step S302).

Next, the power controller 113 receives a battery-residual-capacity response from the battery-control IC 125 (step S303), and the CPU 110 receives the battery-residual-capacity response from the power controller 113 (step S305). Thereby, the CPU 110 obtains the residual capacity of the power storage unit 105.

Next, the CPU 110 determines whether the battery residual capacity is smaller than a charge threshold (step S307). This charge threshold represents the electric energy charged in the power storage unit 105, and is set to a different value depending on the operation mode.

When the determination result in the step S307 shows that the battery residual capacity is smaller than the charge threshold (YES in the step S307), the CPU 110 instructs the power controller 113 to charge (step S311), the power controller 113 turns ON the charging system relay 122 (step S313), and the process returns to the step S301.

On the other hand, when the determination result in the step S307 shows that the battery residual capacity is not smaller than the charge threshold (NO in the step S307), the CPU 110 instructs the power controller 113 to stop charging (step S321), and the power controller 113 receives a charging stop instruction from the CPU 110 (step S323).

Then, the power controller 113 turns OFF the charging system relay 122 (step S325), and this process finishes.

Thus, while the residual capacity of the power storage unit 105 is smaller than the set-up charge threshold, the charge to the power storage unit 105 is continued. When the residual capacity of the power storage unit 105 exceeds the charge threshold, the charging is stopped.

Figure 4:
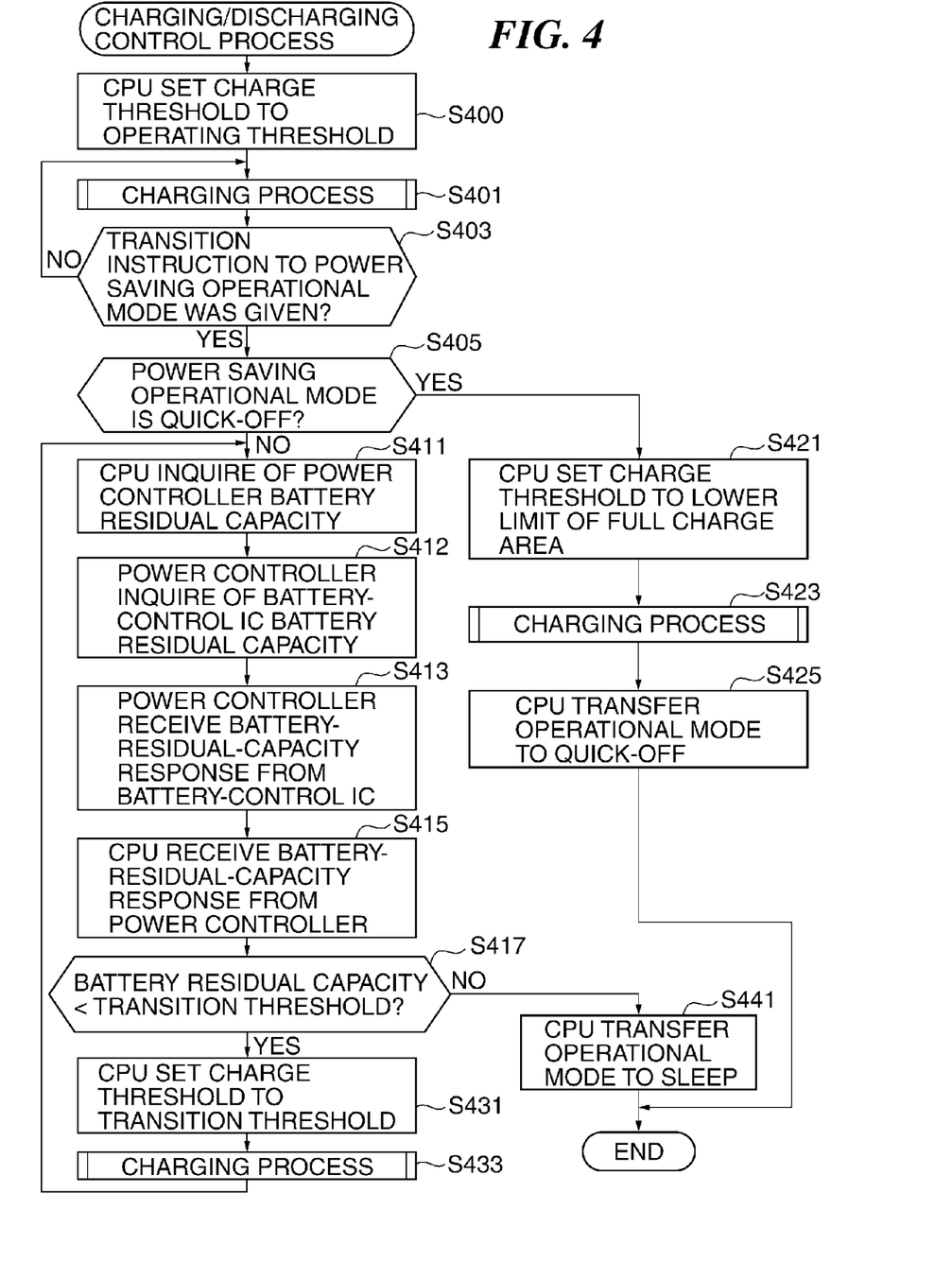
FIG. 4 is a flowchart showing a charging/discharging control process executed by the system controller shown in FIG. 1.

FIG. 4 is a flowchart showing a charging/discharging control process executed by the system controller 101 shown in FIG. 1.

As shown in FIG. 4, the image forming apparatus 100 stores a default charge threshold supposing a normal operation in a ROM (not shown) as an operating threshold (a factory default threshold). The CPU 110 sets the charge threshold to the operating threshold during a normal operation (step S400).

Next, the CPU 110 executes the charging process shown in FIG. 3 to charge the power storage unit 105 (step S401). The above-mentioned step S401 corresponds to the charge unit that charges the battery 126 until the battery residual capacity of the battery 126 reaches the operating threshold in the normal operational mode.

When the charging process is completed, the CPU 110 determines whether the transition instruction to the power saving operational mode was given (step S403). When the determination result in the step S403 shows that the transition instruction to the power saving operational mode was not given (NO in the step S403), the process returns to the step S401.

On the other hand, when the determination result in the step S403 shows that the transition instruction to the power saving operational mode was given (YES in the step S403), the CPU 110 determines whether the power saving operational mode designated by the transition instruction is the quick-off (step S405).

When the determination result in the step S405 shows that the power saving operational mode designated by the transition instruction was not the quick-off (NO in the step S405), the CPU 110 inquires of the power controller 113 the battery residual capacity (step S411), and the power controller 113 inquires of the battery-control IC 125 the battery residual capacity (step S412).

Next, the power controller 113 receives a battery-residual-capacity response from the battery-control IC 125 (step S413), and the CPU 110 receives the battery-residual-capacity response from the power controller 113 (step S415).

Next, the CPU 110 determines whether the battery residual capacity is smaller than a transition threshold (step S417). This transition threshold is a lower limit of the battery residual capacity of the power storage unit 105 that allows the transition to the sleep, and is defined beforehand.

When the determination result in the step S417 shows that the battery residual capacity is below the transition threshold (YES in the step S417), the CPU 110 sets the charge threshold to the transition threshold (step S431) in order prevent overdischarge due to continuous discharge in the sleep, executes the charging process shown in FIG. 3 (step S433), and returns the process to the step S411.

The above-mentioned steps S417, S431, and S433 correspond to a first transition control unit that makes the apparatus transfer to the sleep after charging the battery 126 until the battery residual capacity reaches the transition threshold, when the battery residual capacity of the battery 126 is smaller than the transition threshold smaller than the operating threshold at the time of transition from the normal operational mode to the sleep.

On the other hand, when the determination result in the step S417 shows that the battery residual capacity is not below the transition threshold (NO in the step S417), the CPU 110 makes the apparatus transfer to the sleep (the step S441), and finishes this process. The above-mentioned steps S417 and S441 correspond to a second transition control unit that makes the apparatus transfer to the sleep as-is, when the battery residual capacity of the battery 126 is larger than the transition threshold at the time of transition from the normal operational mode to the sleep.

When the determination result in the step S405 shows that the power saving operational mode designated by the transition instruction was the quick-off (YES in the step S405), the CPU 110 sets the charge threshold to the lower limit of the full charge area (step S421), and executes the charging process shown in FIG. 3 (step S423).

Then, the CPU 110 makes the apparatus transfer to the quick-off (step S425), and finishes this process. The above-mentioned steps S405, S421, S423, and S425 correspond to a third transition control unit that makes the apparatus transfer to the quick-off after charging the battery 126 to the battery residual capacity that is larger than the operating threshold and is lower than the full charge at the time of transition from the normal operational mode to the quick-off.

Figure 5:
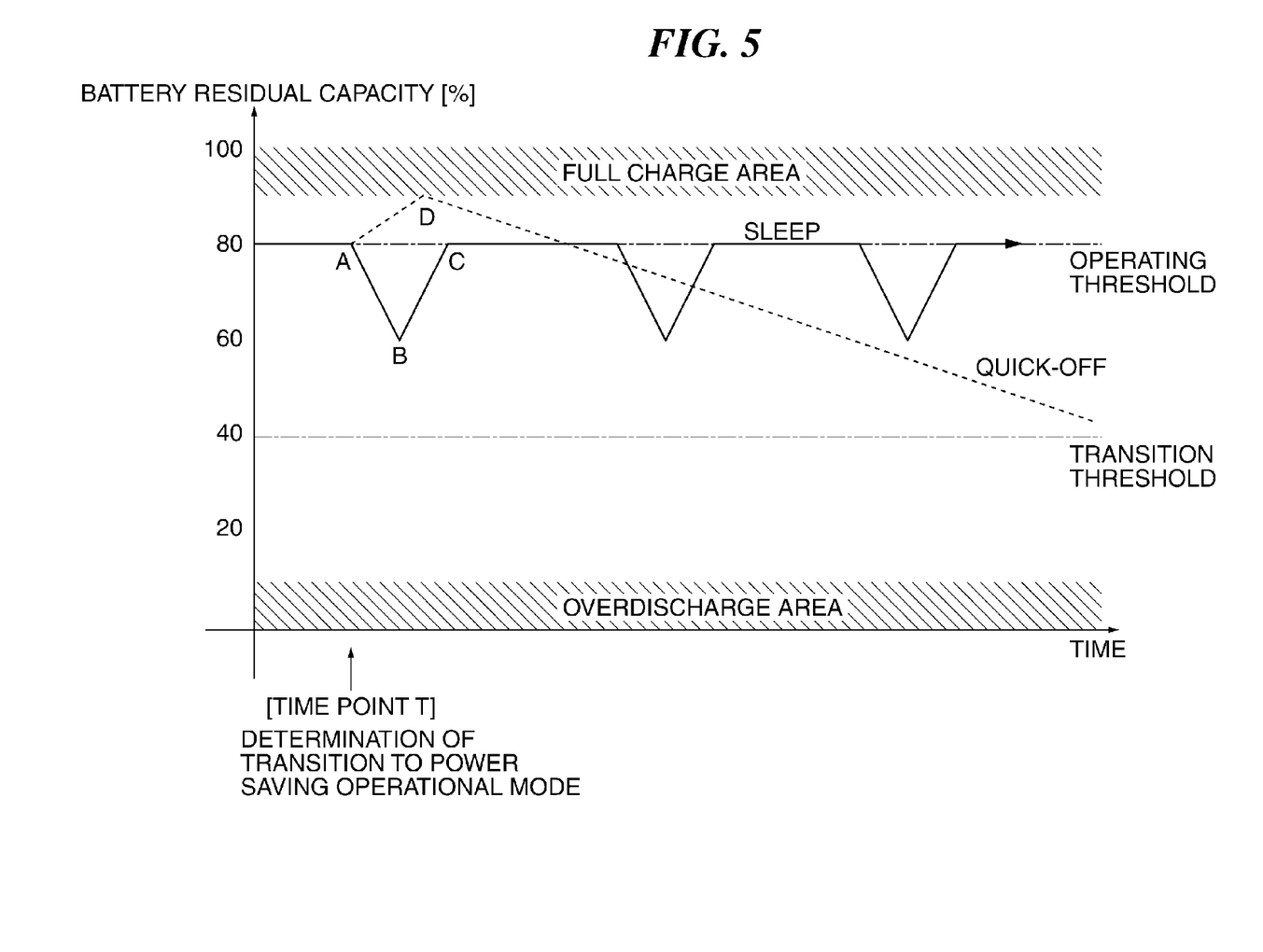
FIG. 5 is a graph showing a relationship between battery residual capacity, which varies depending on a branch in step S405 in the process shown in FIG. 4, and an operating threshold and a transition threshold.

FIG. 5 is a graph showing a relationship between the battery residual capacity, which varies depending on a branch in the step S405 in the process shown in FIG. 4, and the operating threshold and the transition threshold.

In FIG. 5, the operating threshold shall be 80%, and the transition threshold shall be 40%, for example. A solid line represents the case of transition to the sleep (NO in the step S405), and a dotted line represents the case of transition to the quick-off (YES in the step S405). vertical axis represents the residual capacity and a horizontal axis represents time. It should be noted that the operating threshold and the transition threshold are defined beforehand based on an experiment result or a setting by a user so as to be enough for operations in the sleep and the quick-off.

The power storage unit 105 has been charged until the battery residual capacity reaches the operating threshold beforehand by executing the charging process in the step S401. At the time point T, the CPU 110 determines the transition to the power saving operational mode, and performs processes to the step S405.

When the power saving operational mode to be transferred is the sleep (NO in the step S405), the image forming apparatus 100 transfers to the sleep immediately, and the battery residual capacity decreases from an A point because the power storage unit 105 discharges.

When the apparatus returns to the normal operational mode at a B point, the battery residual capacity increases because the charging to the power storage unit 105 starts by the charging process. However, since the charge threshold is the operating threshold, the battery residual capacity does not exceed the operating threshold as shown by the value at a C point.

Since it is assumed that the apparatus in the sleep returns to the normal operational mode in short time, the battery residual capacity repeats increase and decrease near the operating threshold like the solid line in FIG. 5.

On the other hand, when the power saving operational mode to be transferred is the quick-off, the CPU 110 tries to charge the power storage unit 105 to near the full charge in order to make the power storage unit 105 supply electric power in long time.

Accordingly, the charge threshold is raised to the lower limit of full charge area, and the battery is charged until reaching a D point. Then, since the apparatus transfers to the power saving operational mode of the quick-off, the battery residual capacity continues decreasing gradually. Thus, the lower limit of full charge area is larger than the operating threshold, and is smaller than the full charge.

Figure 6:
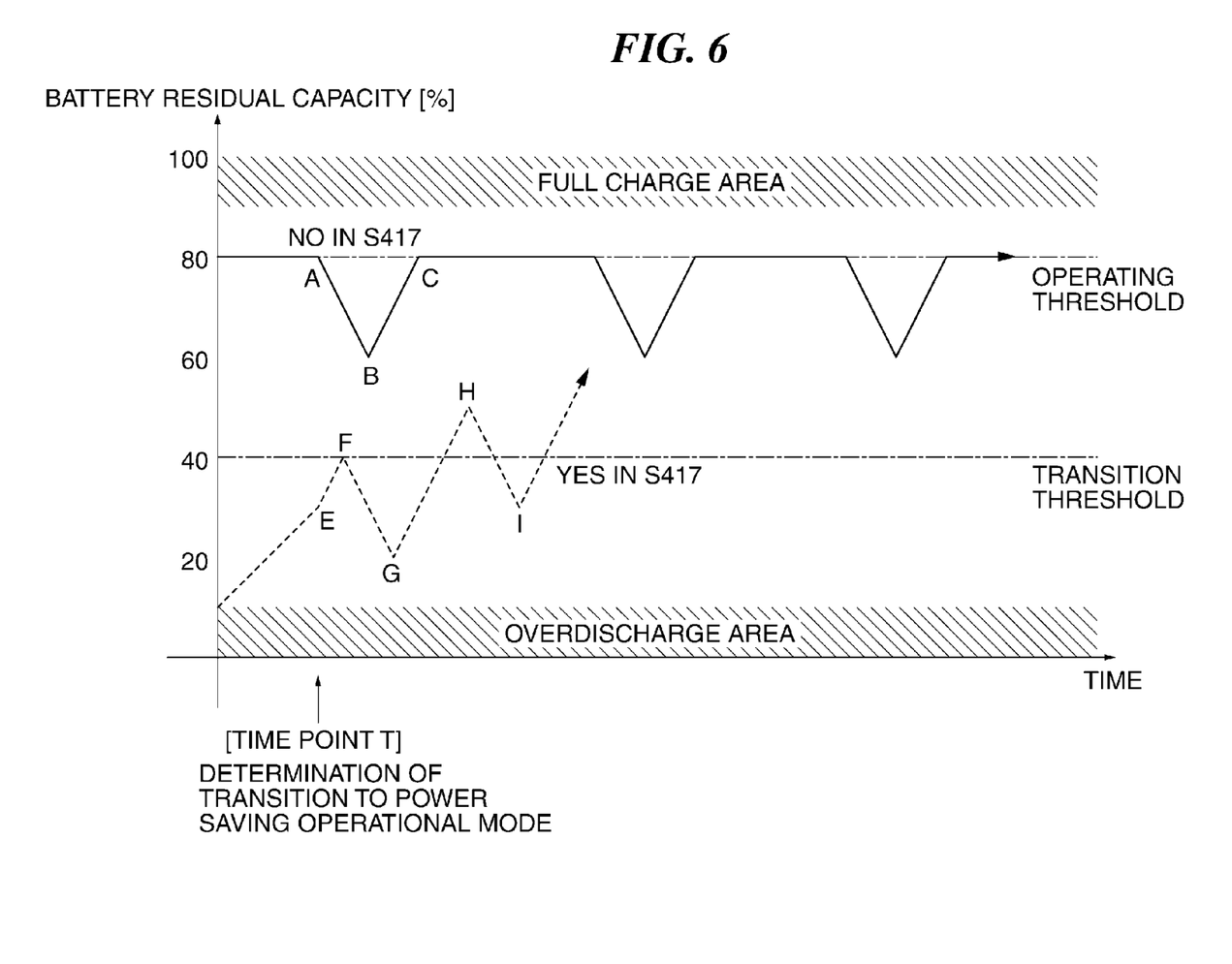
FIG. 6 is a graph showing a relationship between battery residual capacity, which varies depending on a branch in step S417 in the process shown in FIG. 4, and the operating threshold and the transition threshold.

FIG. 6 is a graph showing a relationship between battery residual capacity, which varies depending on a branch in step S417 in the process shown in FIG. 4, and the operating threshold and the transition threshold.

In FIG. 6, a solid line represents the case where the battery residual capacity is larger than the transition threshold (NO in the step S417), and a dotted line represents the case where the battery residual capacity is smaller than the transition threshold (YES in the step S417). Moreover, as well as FIG. 5, the operating threshold shall be 80%, and the transition threshold shall be 40%, for example. A vertical axis represents the residual capacity and a horizontal axis represents time.

Behavior when the battery residual capacity is larger than the transition threshold is the same as the case of the sleep in FIG. 5.

On the other hand, when the battery residual capacity is below the transition threshold (an E point), the CPU 110 sets the charge threshold to the transition threshold and starts charging, even if the transition to the power saving operational mode was determined at the time point T.

As a result, the battery residual capacity increases to an F point. Since the battery residual capacity becomes larger than the transition threshold at the F point, the image forming apparatus 100 transfers to the sleep, and the battery residual capacity is decreasing.

Then, when the apparatus returns to the normal operational mode at a G point, the charging is restarted by the charging process. A transition to the power saving operational mode shall be performed again when the battery residual capacity increases to an H point.

At this time, since the battery residual capacity at the H point is larger than the transition threshold, the determination result in the step S417 is NO, and the apparatus transfers to the sleep immediately.

As described above, according to the embodiment, the charge threshold that is the charge upper limit to the power storage unit 105 is changed according to the power saving operational mode to be transferred, which enables to charge the suppliable electric energy that is required in each power saving operational mode.

This meets a demand to transfer to the sleep immediately because of charging beforehand. Moreover, even when the battery residual capacity of the power storage unit 105 is insufficient, the apparatus transfers to the sleep as soon as possible because only necessary minimum charging is performed by setting the transition threshold.

Even in any cases, an electronic apparatus, which is operable in a power saving operational mode, can be controlled so that a battery is not overcharged and is not overdischarged. As a result, since it is unnecessary to enlarge a battery capacity for a margin, the cost is reduced.

The above-mentioned charging/discharging control process shown in FIG. 4 is based on the assumption that the power storage unit 105 does not enter an overdischarging state.

However, the control shown in FIG. 4 may not prevent the apparatus from entering the overdischarging state when a period of the operation in the power saving operational mode is actually longer than a design value. Accordingly, when the apparatus is operating in the power saving operational mode, it is desirable to execute periodically the anti-overdischarge charging/discharging control process shown in FIG. 7.

Figure 7:
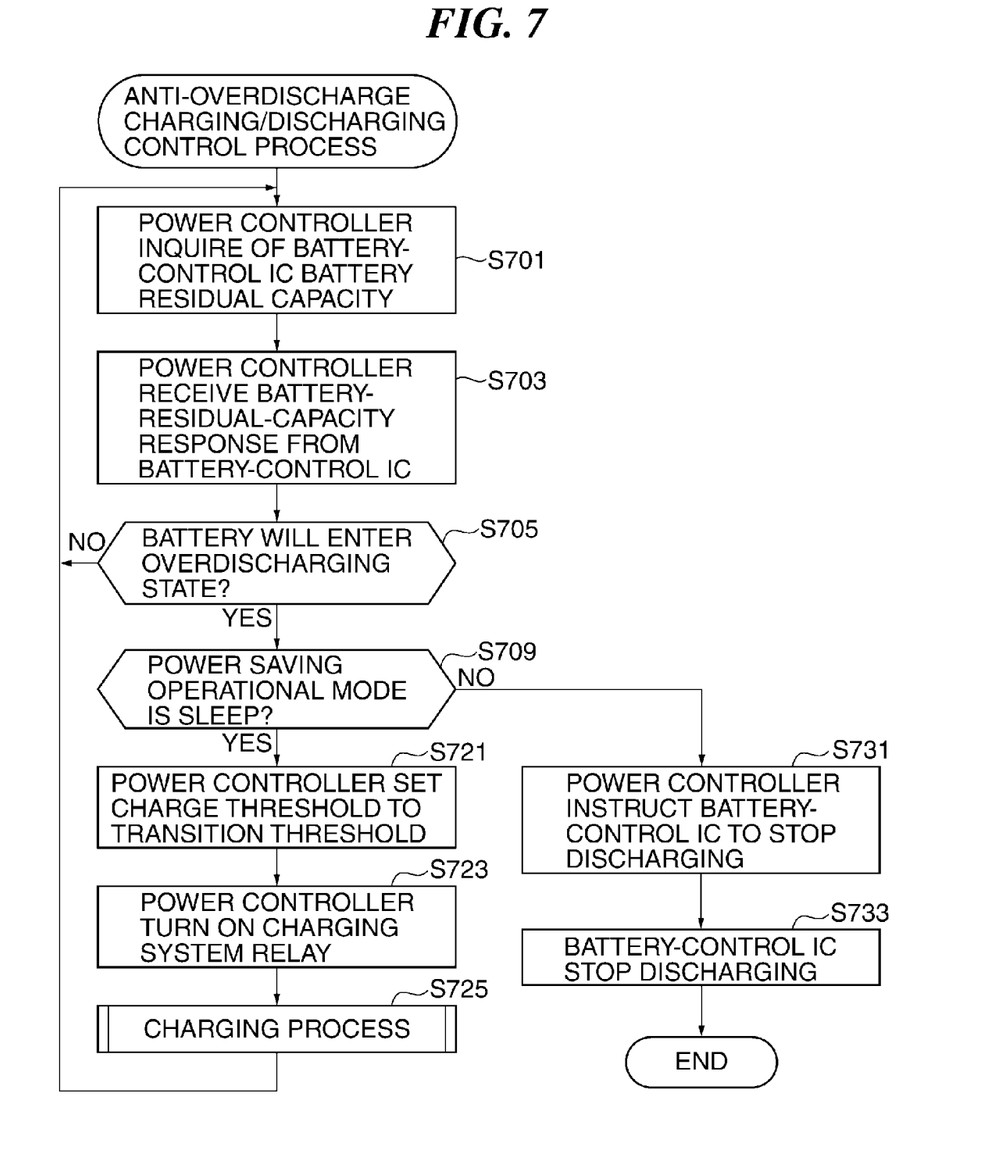
FIG. 7 is a flowchart showing an anti-overdischarge charging/discharging control process executed by the system controller shown in FIG. 1.

FIG. 7 is a flowchart showing the anti-overdischarge charging/discharging control process executed by the system controller 101 shown in FIG. 1.

In FIG. 7, the image forming apparatus 100 shall be operating in the power saving operational mode. The power controller 113 inquires of the battery-control IC 125 the battery residual capacity (step S701), and receives a battery-residual-capacity response (step S703).

Next, the power controller 113 determines whether the battery 126 will enter the overdischarging state based on the received battery residual capacity (step S705). Here, the power controller 113 determines that the battery 126 will enter the overdischarging state when the battery residual capacity is below an overdischarge threshold defined beforehand to prevent the battery 126 from entering the overdischarging state. When the determination result in the step S705 shows that the battery 126 will not enter the overdischarging state (NO in the step S705), the process returns to the step S701.

On the other hand, when the determination result in the step S705 shows that the battery 126 will enter the overdischarging state (YES in the step S705), the power controller 113 determines whether the power saving operational mode in operation is the sleep (step S709).

When the determination result in the step S709 shows that the power saving operational mode is the sleep (YES in the step S709), the power controller 113 sets the charge threshold to the transition threshold (step S721).

Then, the power controller 113 turns ON the charging system relay 122 (step S723), performs the charging process shown in FIG. 3 (step S725), and returns the process to the step S701. Thus, when the battery residual capacity of the battery 126 becomes the overdischarge threshold defined beforehand to prevent the battery 126 from entering the overdischarging state during the operation in the sleep, the battery 126 is charged until the battery residual capacity reaches the transition threshold. The overdischarge threshold will be described with reference to FIG. 8.

On the other hand, when the determination result in the step S709 shows that the power saving operational mode is not the sleep (NO in the step S709), the power controller 113 instructs the battery-control IC 125 to stop discharging (step S731).

Then, the battery-control IC 125 stops discharging (step S733), and finishes this process. Thus, when the battery residual capacity of the battery 126 becomes the overdischarge threshold during the operation in the quick-off, the discharging from the battery 126 is stopped.

Figure 8:
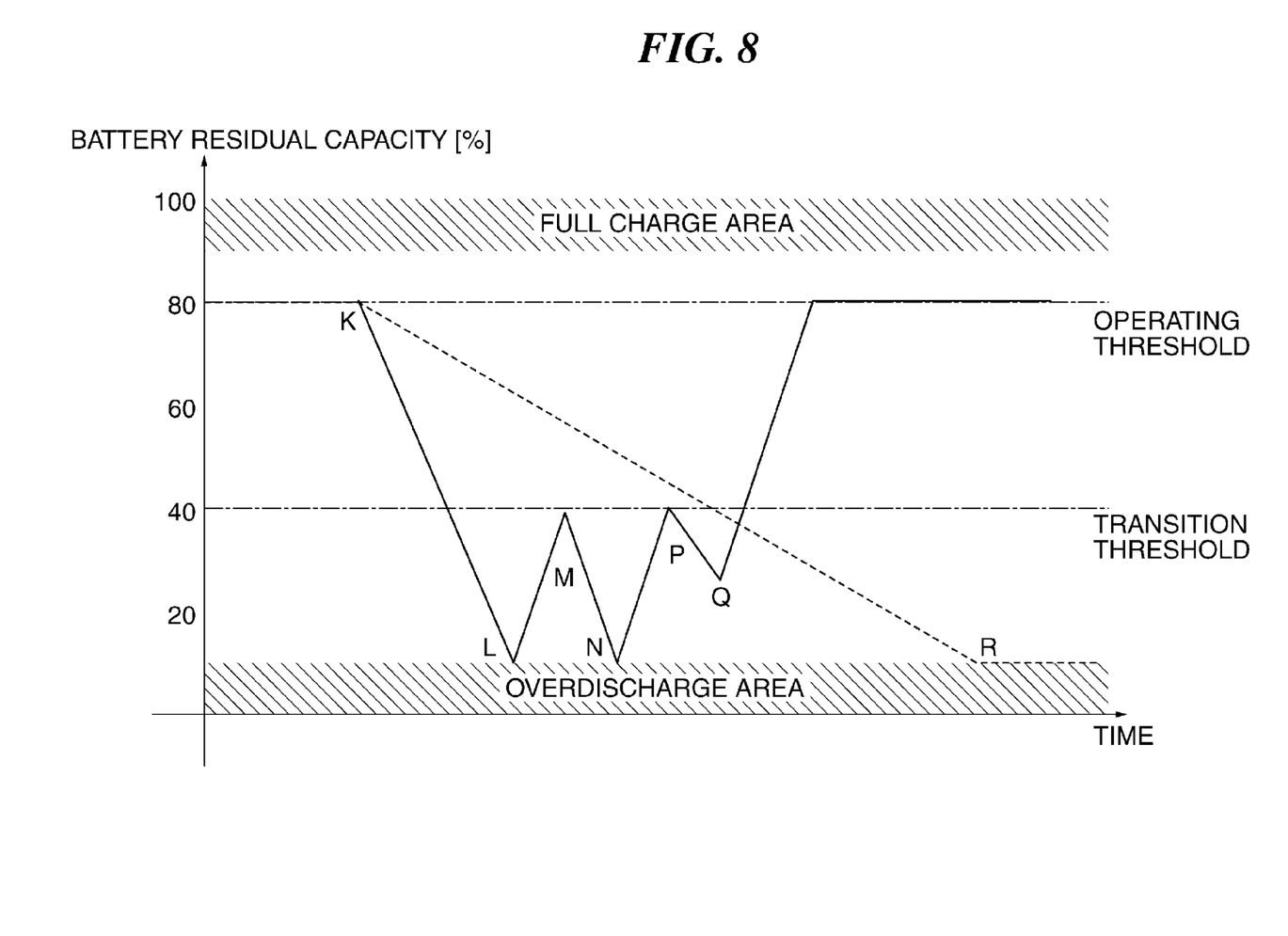
FIG. 8 is a graph showing a relationship between battery residual capacity when the anti-overdischarge charging/discharging control process is executed, and the operating threshold and the transition threshold.

FIG. 8 is a graph showing a relationship between the battery residual capacity when the anti-overdischarge charging/discharging control process is executed, and an operating threshold and a transition threshold.

In FIG. 8, a solid line represents the case of transition to the sleep (YES in the step S709), and a dotted line represents the case of transition to the quick-off (NO in the step S709). Moreover, as well as FIG. 5, the operating threshold shall be 80%, and the transition threshold shall be 40%, for example. A vertical axis represents the residual capacity and a horizontal axis represents time.

First, the case of the sleep will be described. The apparatus enters in the sleep at a K point, and the battery residual capacity decreases gradually until reaching an L point. The battery residual capacity at the L point is the overdischarge threshold that is boundary with an overdischarge area as shown in FIG. 8.

When the power controller 113 that is monitoring the battery residual capacity determines that the battery residual capacity reaches the overdischarge area, the power controller 113 turns ON the charging system relay 122 to start charging.

Since the charge threshold has been changed to the transition threshold at the time, the charging is finished at an M point, and the power storage unit 105 starts discharging. Then, when the battery residual capacity reaches the overdischarge area again at an N point, the power storage unit 105 starts charging until the battery residual capacity reaches the transition threshold. The charging is finished at a P point, and the residual capacity decreases by discharging. Thus, the operation in the sleep continues by repeating charging and discharging so that the residual capacity varies between the overdischarge area and the transition threshold. When the operational mode shall switch to the normal operational mode at a Q point, the battery is charged until the residual capacity reaches the operating threshold.

Next, the case of the quick off will be described. The apparatus transfers to the quick-off at the K point, and the battery residual capacity decreases gradually and reaches to an R point.

When the power controller 113 that is monitoring the battery residual capacity determines that the battery residual capacity reaches the overdischarge area, the power controller 113 instructs the battery-control IC 125 to stop discharging. As a result, the battery residual capacity is maintained in the upper limit of the overdischarge area.

As described above, when the power storage unit 105 discharges and reaches the overdischarging state, the battery is charged temporarily and the sleep continues according to the anti-overdischarge charging/discharging control process in FIG. 8. Since the battery is charged until the residual capacity just reaches the transition threshold, the apparatus returns to the sleep in the minimum time. As a result, the sleep is continuable while minimizing the increase of the power consumption of charging.

On the other hand, the discharging is stopped when the power saving operational mode is the quick-off. Since the quick-off is designed so as to allow taking long time for returning from the power saving operational mode, the apparatus will return to the normal operational mode by cold boot at the next time instead of the return from the power saving operational mode.

Even in any power saving operational modes, the apparatus can operate within the designed range without making the battery fall into the overdischarging state.

The above-mentioned embodiment meets the demands in the two power saving operational modes including the sleep and the quick-off, and enables to control so that the battery is not overcharged and is not overdischarged. As a result, since it is unnecessary to enlarge a battery capacity for a margin, the cost is reduced.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-251263, filed on Nov. 15, 2012, which is hereby incorporated by reference herein in its entirety.

What is claimed is:

1. An electronic apparatus that is operatable in a normal mode and a first power saving mode with less power consumption than the normal mode, comprising:
   a transition unit configured to transit a mode of the electronic apparatus from the normal mode to the first power saving mode;

a battery configured to supply electric power to a part of the electronic apparatus in the first power saving mode;

a charging unit configured to charge the battery in the normal mode; and a control unit configured to control, in a case that a battery residual amount of the battery is smaller than a first threshold when the transition unit transits the mode of the electronic apparatus from the normal mode to the first power saving mode, the charging unit to charge the battery before the transition unit transits the mode of the electronic apparatus from the normal mode to the first power saving mode, and then the transition unit to transit the mode of the electronic apparatus from the normal mode to the first power saving mode in accordance with the battery residual amount charged by the charging unit becoming the first threshold, wherein the control unit controls, in a case that the battery residual amount is larger than the first threshold when the transition unit transits the mode of the electronic apparatus from the normal mode to the first power saving mode, the transition unit to transit the mode of the electronic apparatus from the normal mode to the first power saving mode.

2. The electronic apparatus according to claim 1, wherein the control unit controls, in a case that the battery residual amount is larger than the first threshold when the transition unit transits the mode of electronic apparatus from the normal mode to the first power saving mode, the transition unit to transit the mode of the electronic apparatus from the normal mode to the first power saving mode immediately.

3. The electronic apparatus according to claim 1, wherein the control unit controls, in a case that the battery residual amount reaches a second threshold in the first power saving mode, the charging unit to charge the battery until the battery residual capacity reaches the first threshold.

4. The electronic apparatus according to claim 1, wherein the electronic apparatus is further operatable in a second power saving mode with less power consumption than the normal mode, wherein the control unit controls, when the transition unit transits the mode of the electronic apparatus from the normal mode to the second power saving mode, the charging unit to charge the battery before the transition unit transits the mode of the electronic apparatus from the normal mode to the second power saving mode, and then the transition unit to transit the mode of the electronic apparatus from the normal mode to the second power saving mode in accordance with the battery residual amount charged by the charging unit becoming a third threshold in the normal mode.

5. The electronic apparatus according to claim 4, wherein the control unit controls, in a case that the battery residual capacity reaches a fourth threshold in the second power saving mode, so as to stop discharging from said battery.

6. A control method for an electronic apparatus that is operatable in a normal mode and a first power saving mode with less power consumption than the normal mode, and that has a battery, the control method comprising:

supplying electric power from the battery to a part of the electronic apparatus in the first power saving mode;

charging the battery in the normal mode;

controlling, in a case that a battery residual amount of the battery is smaller than a first threshold when transition from the normal mode to the first power saving mode is made, so as to charge the battery before the transition of the mode from the normal mode to the first power saving mode, and then make a transition from the normal mode to the first power saving mode in accordance with the battery residual amount becoming the first threshold, and controlling, in a case that the battery residual amount is larger than the first threshold when the mode of the electronic apparatus transitions from the normal mode to the first power saving mode, to transition the mode from the normal mode to the first power saving mode.

7. A non-transitory computer-readable storage medium storing a control program causing a computer to execute a control method for an electronic apparatus that is operatable in a normal mode and a first power saving mode with less power consumption than the normal mode, and that has a battery, the control method comprising:

supplying electric power from the battery to a part of the electronic apparatus in the first power saving mode;

charging the battery in the normal mode;

controlling, in a case that a battery residual amount of the battery is smaller than a first threshold when transition from the normal mode to the first power saving mode is made, so as to charge the battery before the transition of the mode from the normal mode to the first power saving mode, and then make a transition from the normal mode to the first power saving mode in accordance with the battery residual amount becoming the first threshold, and controlling, in a case that the battery residual amount is larger than the first threshold when the mode of the electronic apparatus transitions from the normal mode to the first power saving mode, to transition the mode from the normal mode to the first power saving mode.

* * * * *